(No Model.)
J. S. RAY.
CORN PLANTER.
No. 264,844.
Patented Sept. 19, 1882.
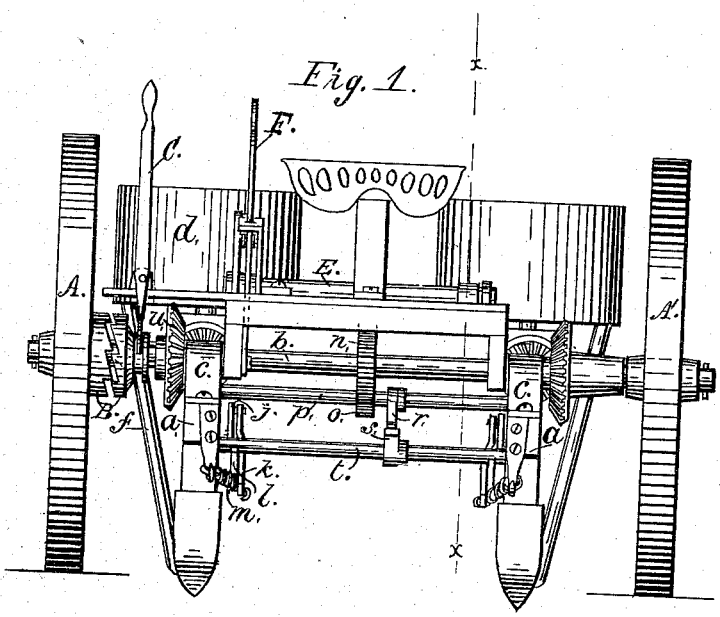
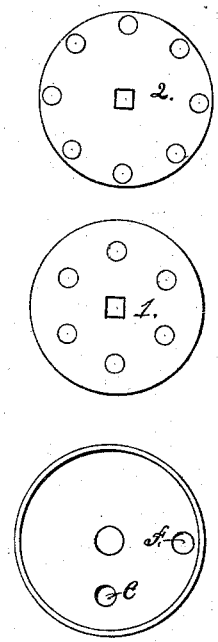
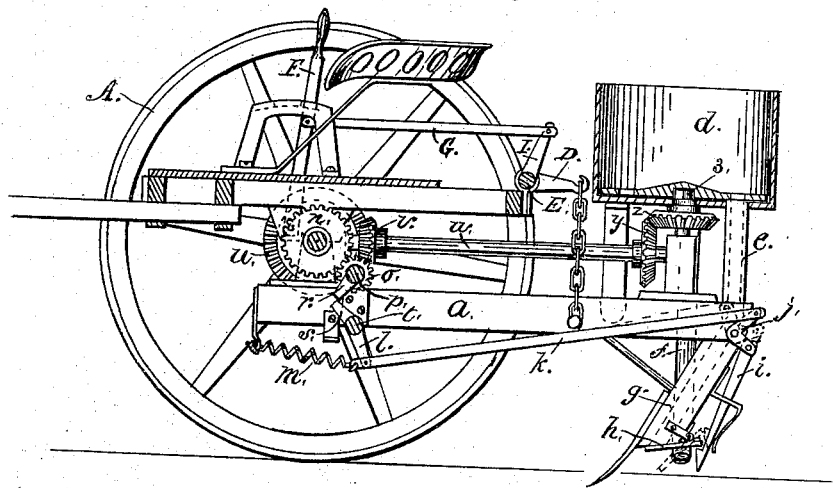
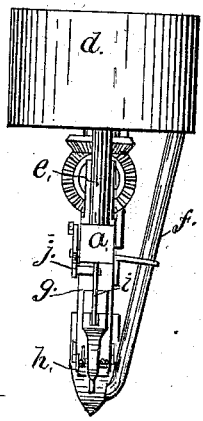
WITNESSES:
Charles A. Lauman
H. P. Hood
INVENTOR:
John S. Ray

UNITED STATES PATENT OFFICE.

JOHN S. RAY, OF INDIANAPOLIS, INDIANA, ASSIGNOR OF ONE-HALF TO CHARLES A. LAUMAN, OF SAME PLACE.

CORN-PLANTER.

SPECIFICATION forming part of Letters Patent No. 264,844, dated September 19, 1882.

Application filed May 22, 1882. (No model.)

*To all whom it may concern:*

Be it known that I, JOHN S. RAY, a resident of Indianapolis, in the county of Marion and State of Indiana, have invented a new and useful Improvement in Corn-Planters, of which the following is a specification, having reference to the accompanying drawings.

My invention relates to that class of corn-planters in which the feeding and dropping mechanism is operated by the forward motion of the carrying-wheels, and which are adapted to plant in hills or drills.

The object of my invention is to provide a means of instantaneously opening and closing the dropper-valve, which means shall at the moment of dropping the corn act independent of the mechanism driven by the carrying-wheel, and thereby insure accurate "checking" in planting.

My invention consists in the means employed to accomplish the above-mentioned results, as hereinafter fully set forth.

The accompanying drawings illustrate my invention.

Figure 1 is a front elevation. Fig. 2 is a side elevation, the point of view being at line *x*, Fig. 1, and the seed-box being in section. Fig. 3 is a rear elevation of the seed-box and dropping mechanism. Fig. 4 is a plan of the seed-box and two feed-plates—No. 1 being for hill planting and No. 2 for drilling.

*a a* represent two plow-beams, to which are attached ordinary shovel-plows. Said beams are attached to the axle *b* by hangers *c c*.

The mechanism connected with both plows is alike, and the following description of one will be sufficient for both:

*d* is the seed-box, mounted on the rear end of the beam. Tubes *e* and *f* lead from the interior of the seed-box to the furrow opened by the plow. The openings to said tubes are placed at different distances from the central shaft, 3, and the series of holes in plates 1 and 2, Fig. 4, are arranged correspondingly, so that when either plate is in its place in the box seed is delivered to but one of the tubes. Tube *e* communicates with the hollow interior of the plow-standard *g*, the lower end of which is closed by a spring-valve, *h*. Valve *h* is operated by means of the hook *i*, bell-crank *j*, rod *k*, arm *l*, and spring *m*. Spring *m* is extended and hook *i* set ready to operate valve *h* by means of the spur-gear *n*, attached to and revolving with the axle, the pinion *o* on shaft *p*, arm *r*, which is also secured to shaft *p*, arm *s*, and shaft *t*, to which arms *s* and *l* are secured. Motion is imparted to the feed-plate in seed-box *a* by a bevel-gear, *u*, which is secured to and revolves with the axle, bevel-pinion *v*, shaft *w*, and miter-gears *y* and *z*. Both carrying-wheels A A' are loose on the axle, and the axle is connected with wheel A by a clutch, B, one part of which is secured to the wheel and the other slides on the axle, being prevented from turning thereon by a "feather" in the usual manner, and is moved by the lever C. The rear ends of the plows are suspended by chains to arms D on each end of shaft E, and are raised simultaneously by the lever F, rod G, and arm I, which are secured to shaft E.

The operation of my invention is as follows: The two parts of clutch B having been thrown together, the axle revolves as the machine is drawn forward, thus revolving the plates in both seed-boxes by means of the bevel-gears *u*, of which there are two—one near each end of the axle—as shown. If the corn is to be planted in hills, the holes in the plates are so arranged that a certain number of grains are deposited in tube *e* during one-half revolution of wheel A, which grains fall to the bottom of the plow-standard and rest on valve *h*. As the axle revolves shaft *p*, which is supported at each end in bearings attached to each plow-beam, is revolved by spur-gears *n* and pinion *o*, arm *r* is brought in contact with arm *s*, and shaft *t*, which is also supported at each end in bearings on the plow-beams, is partially revolved by means of arm *l*, carrying rod *k* backward and hook *i* downward till the hook slips under the projecting end of valve *h*. Spring *m* is by this movement put in tension, and as the wheel A completes a half-revolution arm *r* passes out of connection with arm *s*, and spring *m* pulls up hook *i*, thereby opening valve *h*, and allowing the corn to drop into the furrow. When the upward motion of hook *i* is nearly complete the hook slips off the end of valve, and it is instantly closed by its spring-hinge. When the corn is to be planted in drills plate 2 is put into the seed-box in place of plate 1, and the seed drops at regular intervals through tube $f$ into the furrow.

I claim as my invention—

The combination, with valve $h$, of hook $i$, bell-crank $j$, rod $k$, arm $l$, spring $m$, shaft-arm $s$, and revolving arm $r$, whereby said valve $h$ is successively engaged, opened, and released in the manner shown and described, and for the purpose set forth.

JOHN S. RAY.

Witnesses:
CHARLES A. LAUMAN,
H. P. HOOD.